United States Patent
Dieterman et al.

(10) Patent No.: US 6,560,704 B2
(45) Date of Patent: May 6, 2003

(54) METHOD OF UPDATING COMPUTER CONFIGURATION SETTINGS

(76) Inventors: Jude Gerard Dieterman, 4203 Richwood Ct., Naperville, IL (US) 60564; Michael Eric Cloran, 1453 W. Melrose St., Chicago, IL (US) 60657; Tracy James Snell, 8432 Sand Lake Shores Ct., Orlando, FL (US) 32836

( * ) Notice: Subject to any disclaimer, the term of this patent is extended or adjusted under 35 U.S.C. 154(b) by 0 days.

(21) Appl. No.: 09/976,409

(22) Filed: Oct. 12, 2001

(65) Prior Publication Data

US 2002/0013896 A1 Jan. 31, 2002

Related U.S. Application Data

(63) Continuation of application No. 09/309,218, filed on May 10, 1999, now abandoned.

(51) Int. Cl.[7] .................................................. G06F 9/00
(52) U.S. Cl. ........................................ 713/100; 709/221
(58) Field of Search ........................... 713/1, 2, 100; 709/220, 221, 222

(56) References Cited

U.S. PATENT DOCUMENTS

| | | | |
|---|---|---|---|
| 5,995,597 A | * 11/1999 | Woltz et al. ............. 379/93.24 |
| 6,012,088 A | * 1/2000 | Li et al. .................... 709/219 |
| 6,026,151 A | * 2/2000 | Bauer et al. .............. 379/115 |
| 6,049,826 A | * 4/2000 | Beser ........................ 709/222 |
| 6,137,805 A | * 10/2000 | Berstis ...................... 370/428 |

* cited by examiner

Primary Examiner—Dennis M. Butler
(74) Attorney, Agent, or Firm—Greenberg Traurig

(57) ABSTRACT

The present disclosure discloses a method for updating computer configuration settings. The method involves a client establishing a communications link with a network service provider. The network service provider determines the optimal configuration settings for the client. The client then receives the optimal configuration settings from the service provider, and stores the optimal configuration settings for subsequent use. Also disclosed is a method in which the configuration settings include telephone numbers through which the client communicates with the service provider. Finally, methods are disclosed in which the optimal configuration settings are determined using combinations of the client's telephone number along with the location, cost, and/or capacity of service provider access numbers.

10 Claims, 5 Drawing Sheets

METHOD OF UPDATING COMPUTER CONFIGURATION SETTINGS

This application is a continuation of application 09/309,218 filed May 10, 1999, now abandoned.

BACKGROUND OF THE INVENTION

The present invention relates in general to communication between computers and, in particular, to communications between a user's client computer and an internet service provider.

Recent years have seen a dramatic increase in the resources available on the internet relating to business, leisure, and education. The increase in resources has been followed by an associated increase in access to the internet—particularly by people in their homes through internet service providers ("ISP's"). As internet usage has become commonplace, more ISP companies have established systems of Points of Presence ("POPs") through which users who subscribe to the ISP's services can access the Internet. These POPs commonly provide telephone numbers that their subscriber's computer can call using a telephone modem by placing an inexpensive, local telephone call. After connecting with a POP, the subscriber can then typically access the internet, or other network services, through the service provider.

In many areas, multiple ISP companies will have one or more POPs located within a given region. Several companies own and/or maintain nationwide POP networks, while others operate POP networks in specific regions or metropolitan areas. Consequently, users—particularly users in urban or suburban areas—may choose from a variety of POPs within their local telephone calling range.

An internet service provider will often contract to lease a certain amount of POP usage in order to provide service for its customers/subscribers over the geographic region serviced by the ISP. For example, an internet service provider in Chicago may own and operate its own POPs throughout the Chicago area. However, if the service provider desires to expand its business to customers in downstate Illinois, that provider may choose to lease POP service from one or more commercial POP providers who have established POPs in downstate Illinois, rather than undergoing the substantial expense of constructing and maintaining its own POP facilities in that distant area. The user can then access that service provider's resources over the internet without the need to dial a telephone number in Chicago and incur extra telephone charges.

Typically, a user will be provided with the telephone numbers for one or more local POPs at the time the user's account is established. Once the account is established, the user will connect to one of the preassigned POPs each time they connect to the internet. New POP telephone numbers are typically provided to the subscriber only when specifically requested by the user. In that case the user must reconfigure its software to update it with the new replacement telephone number for the new POP.

Unfortunately, this prior art method of access does not allow a service provider to maintain maximum system flexibility with minimum customer inconvenience. For example, if a service provider negotiates a particularly advantageous contract with a particular POP network in a given region, the service provider will typically not realize the full value of the better rate because existing users will continue to dial into previously-assigned, more expensive POPS. Because the user typically pays a flat rate for ISP service, the unrealized savings are lost profit to the ISP. Moreover, to move the subscribers to the new POP, the ISP must contact each subscriber to have them enter a new telephone number. The ISP will typically incur additional customer service expenses and possible loss of customer goodwill, and even then all users may not switch.

As a second example, one particular POP may become utilized by a disproportionately large number of local users, causing users to experience frequent busy signals or otherwise unreliable service. Meanwhile, another local POP may simultaneously have excess capacity, which goes unused because few users have selected that POP access number.

As a third example, oftentimes an ISP's network and service grows gradually over time. As the number of subscribers increases, the economically feasible hardware infrastructure that can be supported by the subscription base also increases. Therefore, oftentimes when a subscriber signs on to a service, there may not be a POP particularly close to the user. This problem is particularly relevant to rural regions, in which sparse population densities can support but a few POPs until the subscriber population reaches a higher level. As the user base grows, a new POP closer to the user may be established. Because the user has previously configured the POP access numbers, the user continues to pay unnecessarily high telephone connection costs. In order to take advantage of the new local POP, the ISP must contact the user, and the user is burdened with altering their computer configuration.

Finally, mobile computing devices are being increasingly utilized. Under the conventional ISP system, each time a user changes location, the user must either pay high telephone rates to access their "regular" POP, or the user must be inconvenienced with the hassle of contacting the ISP to obtain a local POP access number for the new location and manually choosing a POP access number appropriate for the new location.

In any of the foregoing examples, the quasi-static nature of network access numbers results in an inefficient allocation of service provider resources, inconvenience to the user, and/or unnecessarily high costs to the user and ISP.

Therefore, it is an object of the present invention to provide a method for dynamically modifying a user's computer configuration, such that a service provider may automatically reassign network access numbers, or modify other communications settings, without effort or even knowledge on the part of the user.

It is another object of this invention to allow an ISP to minimize the cost of POP leases when providing service to a broad geographic region.

It is a further object of this invention to minimize the telephone access charges to the user of an internet service provider.

It is yet another object of this invention to prevent an ISP POP from becoming over-utilized, such that users are not faced with busy signals and inferior system performance.

It is another object of this invention to reduce the expense and inconvenience of ISP usage for travelling users of mobile computing devices.

These and other objects of the present invention will become apparent in light the present specification and drawings.

SUMMARY OF THE INVENTION

The invention consists of a method for automatically updating network configuration settings on a modem equipped client computer. The client establishes a connection with a service provider. The service provider determines an optimal network configuration for the client, and transmits the optimal configuration to the client. The client then accepts and stores the new configuration settings.

One aspect of the invention involves the automatic determination and setting of preferred service provider telephone access numbers and client configurations when the client connects to the service provider. Preferred access numbers can be determined on the bases of geographic location, POP usage charge, and residual connection capacity.

Specifically, the method for automatically updating network configuration settings includes the steps of: having the client computer dial a telephone number assigned to an internet service provider toward establishing a communication link between the client computer and the internet service provider computer via the client computer modem; having the internet service provider determine the optimal configuration settings; transmitting the optimal configuration settings from the internet service provider to the client computer; and storing the new configuration settings in the client computer.

The desired configuration settings include one or more preferred telephone numbers through which the client computer may establish communication with the internet service provider. The step of determining the desired configuration settings may include the substeps of: Identifying the telephone number from which the client computer has dialed a call to the internet service provider telephone number; and selecting one or more additional or replacement telephone numbers which may be dialed by the client computer to establish subsequent communication with the internet service provider.

In one embodiment of the invention the step of selecting one or more additional or replacement internet service provider telephone numbers may include the substep of identifying telephone numbers which are geographically closest to the location from which the user has initiated its call to the internet service provider as well as the substep of ranking the telephone numbers by the price charged for network access by each internet service provider or the amount of available service capacity.

DETAILED DESCRIPTION OF THE DRAWINGS

Figure 1:
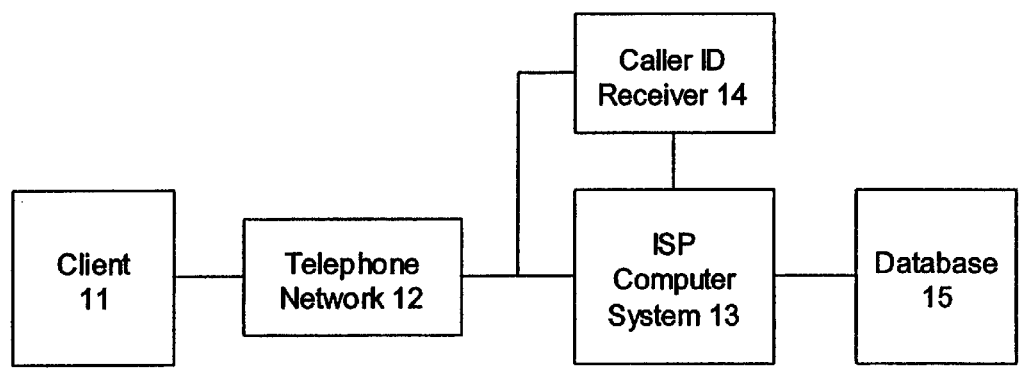
FIG. 1 of the drawings consists of a block diagram of a first embodiment of the invention, in which the user's location is determined using caller ID.

While this invention is susceptible to embodiment in many forms, there is shown in the drawings and will herein be described in detail specific embodiments, with the understanding that the present disclosure is to be considered as an exemplification of the principles of the invention and is not intended to limit the invention to embodiments illustrated.

The present invention comprises a method for controlling a computer user's configuration settings by an internet service provider ("ISP"). The ISP transparently revises a user's communications configuration in order to optimize network performance, and minimize costs to both the user and the ISP, without requiring undue effort on the part of the user.

FIG. 1 depicts one particular embodiment of a system which implements the method of the present invention. Client computer 11 connects to ISP computer system 13 through telephone network 12. The connection will typically be made through modems that are integral to both the client and ISP computers. The ISP is also shown equipped with Caller ID receiver/decoder 14. Receiver 14 detects and conveys the client's originating telephone number into ISP computer 13. The functionality of receiver 14 can also be integral into the modem of ISP computer 13, such that a separate hardware device is unnecessary. Finally, the embodiment of FIG. 1 further includes database 15. Database 15 maintains information relevant to the determination of optimal configuration settings for the user operating client computer 11. For example, database 15 can include one or more of the following types of information: all POP telephone access numbers, geographical relations between telephone prefixes, cost to the ISP for usage of each POP, POP utilization rates and history, etc.

Figure 2:
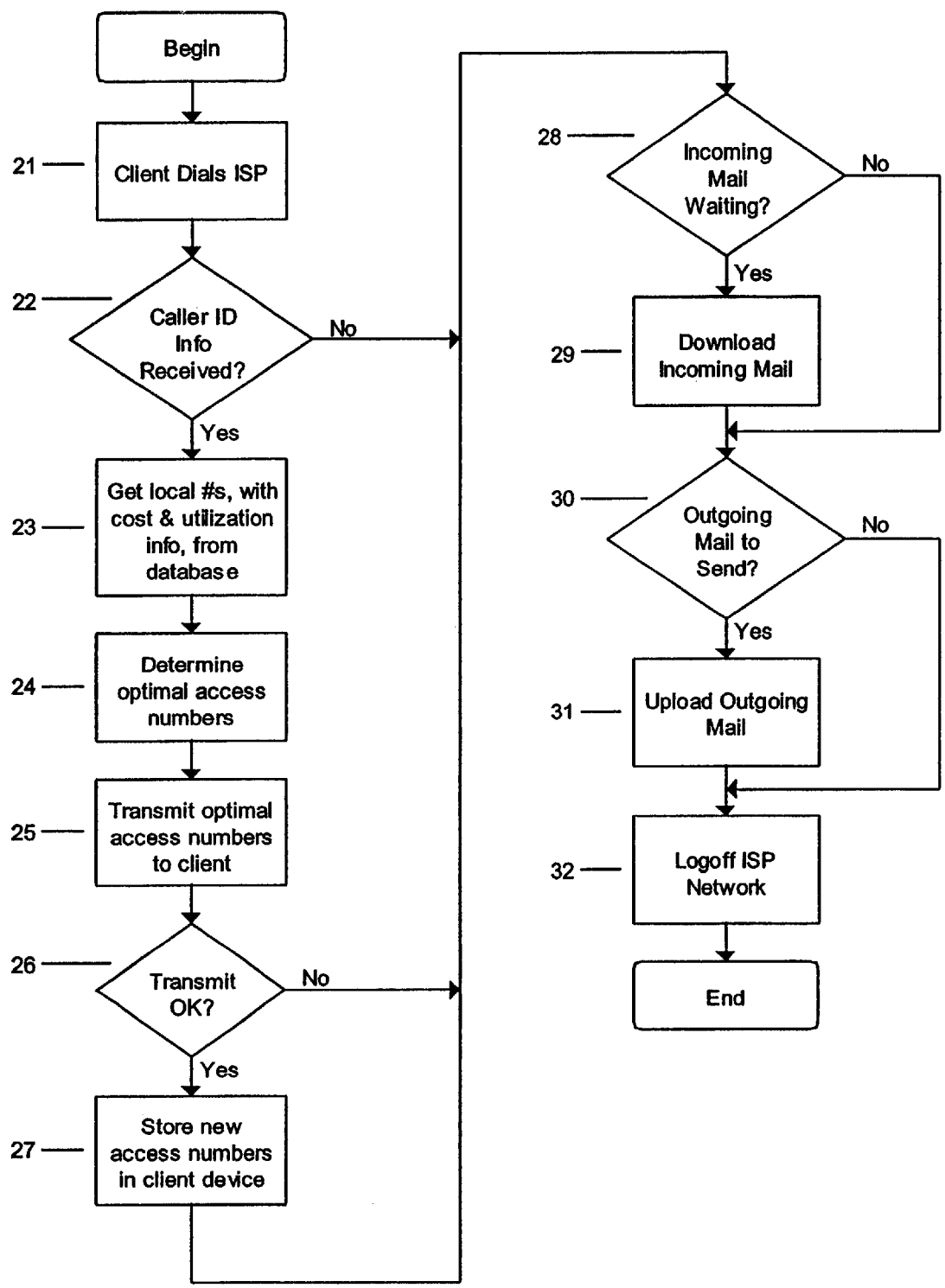
FIG. 2 of the drawings is a flow chart of the method as implemented in the first embodiment.

A flowchart illustrating the method embodied in an email system appears as FIG. 2. Client 11 first connects to ISP computer 13 through telephone network 12, step 21. ISP computer 13 then determines whether caller identification information has been successfully received, step 22. If the caller ID information has not been received, the system is unable to determine an optimal configuration for the user, and the system instead continues with the email transaction, step 28. Optionally, if caller ID information is not received, the system could obtain the originating telephone number by other means, such as prompting the user for manual entry.

If the ISP receives the user's originating telephone number, it then proceeds to retrieve information from database 15, step 23. In the embodiment illustrated, ISP 13 determines the POPs closest to the user's location, whether the POPs require a local or timed telephone call for the user, the cost to the ISP for usage of each POP, and the level of utilization of each POP.

Next, the ISP determines one or more optimal access telephone numbers for the user, step 24. In the embodiment illustrated, first the ISP selects numbers which are local, untimed telephone calls for the user, if any, to minimize the user's costs. If no access numbers are untimed, the ISP selects the closest numbers to the user. Next, the ISP deselects numbers which exceed a utilization threshold, for example, greater than 2% of the time at full capacity. Finally, the ISP ranks the remaining access numbers in order of cost to the ISP, lowest to highest. The particular criteria used by the ISP in determining the optimal configuration information for the user will depend on the details of a particular implementation of the method, and are not considered to limit the scope of the invention.

ISP computer system 13 transmits the two best POPs to client 11, along with the appropriate communications configuration information for each, step 25. If client 11 successfully receives the new settings, step 26, they are stored, overwriting any previous settings, step 27.

After the configuration information is pushed, the system proceeds with its remaining functionality. In the embodiment illustrated, client 11 checks for incoming email waiting at the ISP, step 28, and downloads the messages, if any, step 29. If the user has generated any outgoing email, step 30, client 11 indicates to ISP computer 13 that outgoing email is present, and uploads the appropriate messages, step 31. Finally, client 11 disconnects from the ISP, step 32.

Figure 3:
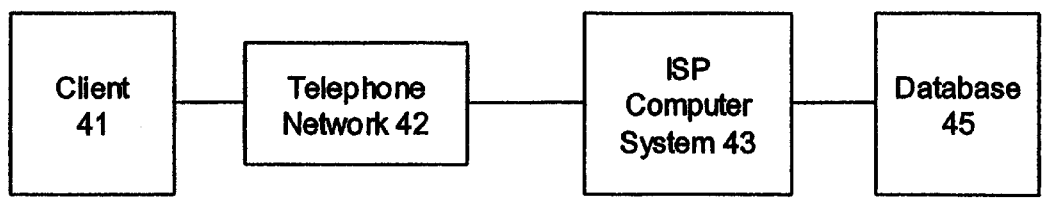
FIG. 3 of the drawings consists of a block diagram of a second embodiment of the invention, in which the user's location is provided by the user.

FIG. 3 depicts another embodiment of the invention, in which the service provided is web browsing, and the originating telephone number is supplied by the user rather than detected by caller ID. This embodiment can be particularly advantageous when the user has a limited number of locations from which most connections are made, such as home, office #1, and office #2. In such a scenario, the numbers for each location could be programmed, such that the user simply selects a location before connecting.

Figure 4:
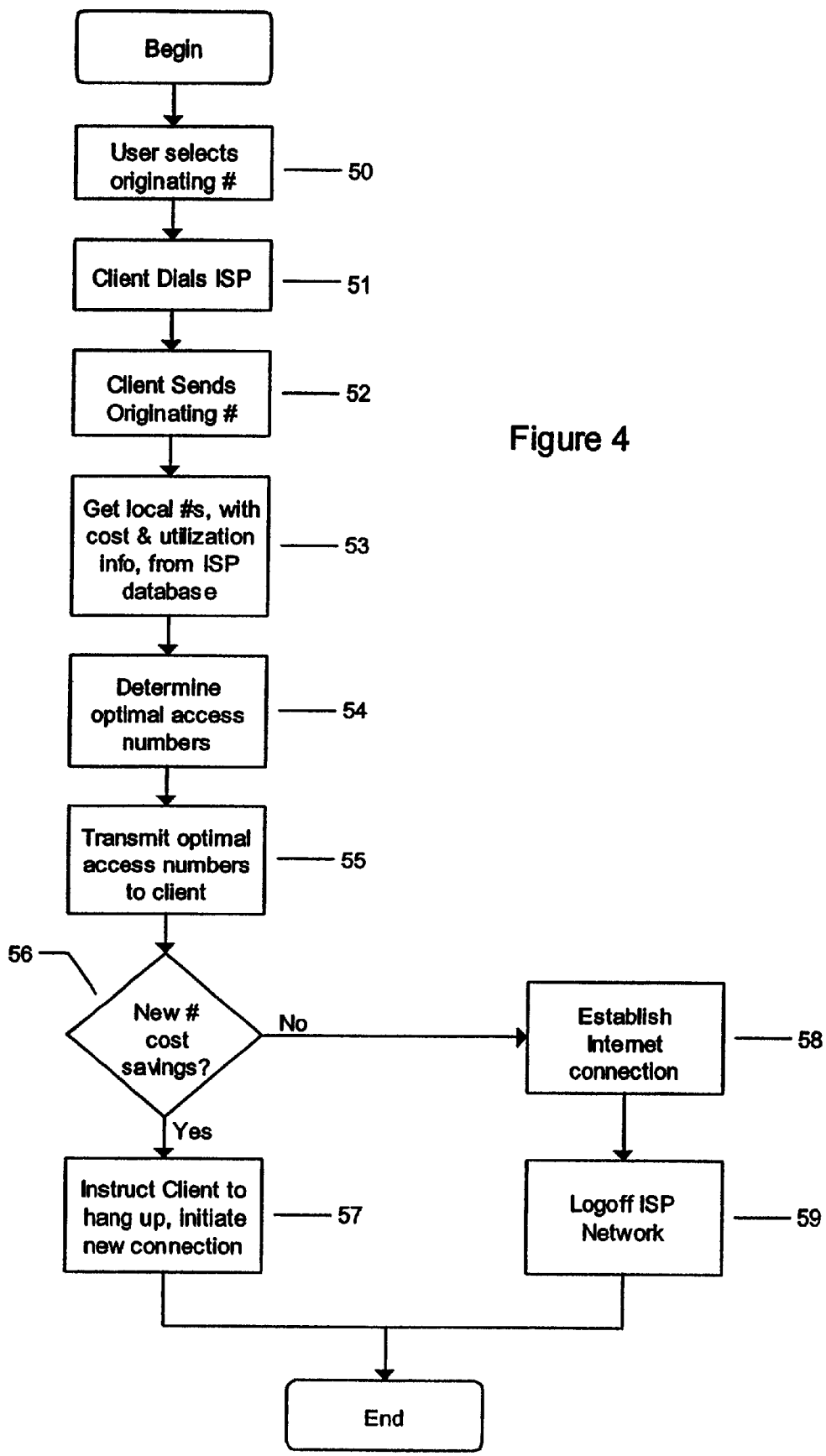
FIG. 4 of the drawings is a flow chart of the operation of the second embodiment when the user provides location information upon connection to the ISP.

FIG. 4 is a flow chart showing operation of the embodiment of FIG. 3. In this embodiment, the user first specifies the telephone number from which the call is originating, step 50. The user could alternatively specify a city and state, or any other geographically-identifying information. Client computer 41 then connects to ISP computer system 43 through telephone network 42 in step 51. Client 41 transmits the originating telephone number that the user has selected to ISP computer 43 in step 52. ISP computer 43 retrieves information about local POPs from database 45 in step 53, and determines one or more optimal POPs, step 54, as in the previous embodiment. Communications configurations corresponding to the optimal POPs are transferred to client 41, step 55, and are stored if received correctly.

For embodiments such as the email service illustrated in FIGS. 1 and 2, in which the user is only connecting for a short period of time to transfer message data, it may be desirable for the user to continue to complete the service provider communication with the POP originally dialed, rather than reconnecting to a new optimal POP. However, in applications for which the connect time is likely to be longer, such as the connection for web browsing illustrated in FIGS. 3 and 4, it may be desirable for the ISP to evaluate whether telephone connection charges to a new chosen POP would be significantly less expensive for the user, step 56. If the dialed POP constitutes a telephone call for which the user pays per minute charges, and another optimal POP connection could be established with an untimed local call, the ISP may signal the client to terminate the connection, and then promptly reconnect with the optimal POP, step 57. If the optimal POP does not represent a significant cost savings to the user, step 58 it may be desirable to continue the current connection to avoid inconveniencing the user. Subsequent connections will be made to the optimal POP.

Figure 5:
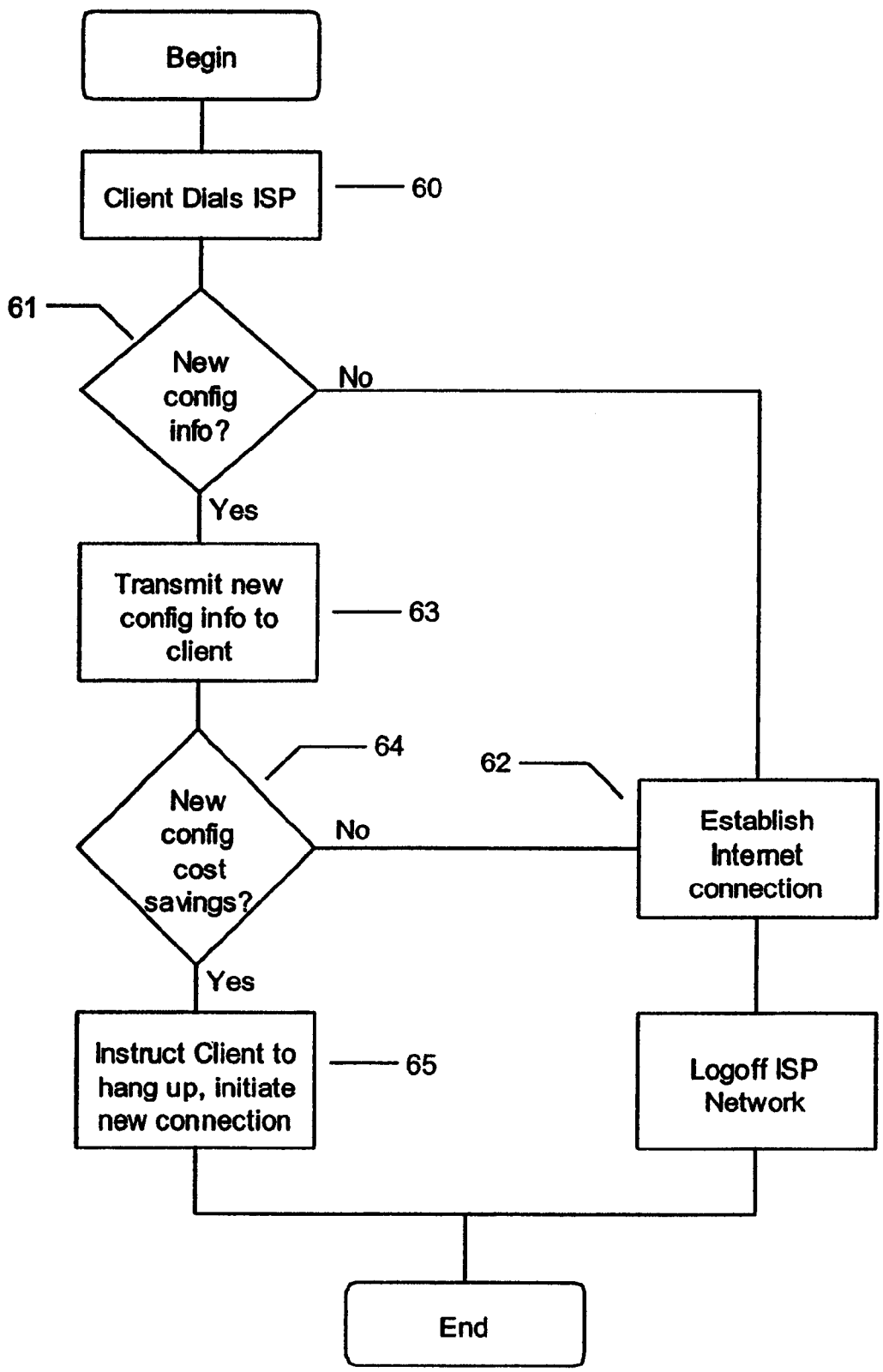
FIG. 5 of the drawings is a flow chart of the operation of the second embodiment when the user's location is retrieved from a stored user profile.

FIG. 5 is a flowchart depicting an alternative embodiment of the operation of the system illustrated in FIG. 3. Under the embodiment of FIG. 5, the user's location or originating telephone number is not queried upon each connection. The ISP instead stores the user's home address and telephone number, along with other information, in database 45 at the time the user signs up for the account. After the client connects to the ISP, step 60, the ISP determines whether any new configurations are desired for the particular user account, step 61. If not, the user is promptly connected to the internet, step 62. If new configuration information is available for the user, it is downloaded and stored, step 63. As in the embodiment of FIG. 4, if the new configuration information constitutes a cost savings for the user, step 64, the connection is terminated, and the client re-establishes a connection with the new POP in step 65. Otherwise, the user is connected to the internet in step 62.

In the embodiment of FIG. 5, the ISP determines which users will be affected by changes in their network when such changes are made. This determination is made based upon the user information supplied during account initiation and stored in database 45. User accounts for which new configuration information is available are flagged in the database, and this flag is queried upon each connection with the ISP. Once the client downloads the new configuration information, the flag is reset. Configuration information may include not only revised telephone access numbers, but may also include modem settings and proxy setting as well as virtually any other configuration or connection data settings relating to establishing, controlling, maintaining and accounting for the communication between two computers.

The embodiment of FIG. 5 is well-suited for environments in which client 41 does not frequently change location. While this embodiment requires user intervention when client 41 changes to a new locale, the ISP gains the ability to control traffic distribution among POPs and reconfigure clients without inconveniencing the users. Furthermore, processing overhead is minimized on both the client and ISP sides because configuration processing is performed only when new information is actually available.

The foregoing descriptions and drawings merely explain and illustrate the invention and the invention is not limited thereto except insofar as the appended claims are so limited, as those skilled in the art who have the disclosure before them will be able to make modifications or variations therein without departing from the scope of the invention.

We claim:

1. A method for automatically updating network communication configuration settings on a modem equipped client computer which is capable of communicating with an internet service provider, said method comprising the steps of:

having the client computer dial a telephone number stored within the client computer toward establishing a communication link between the client computer and the internet service provider computer via the client computer modem;

having the internet service provider determine the identity of the client computer and telephone number dialed by the client computer to communicate with the internet service provider;

having the internet service provider determine whether the identified client computer should dial a different telephone number when the client computer next attempts to establish communication with the internet service provider each time the client computer communicates with the internet service provider;

transmitting the new telephone number from the internet service provider to the client computer when it is determined that a different number should be dialed when the client computer next attempts to establish communication with the internet service provider;

storing the new telephone number in the client computer.

2. The method of claim 1, in which the client computer stores one or more preferred telephone numbers through which the client computer may establish communication with the internet service provider.

3. A method for automatically updating network communication configuration settings on a modem equipped client computer which is capable of communicating with an internet service provider, said method comprising the steps of:

having the client computer dial a telephone number stored within the client computer toward establishing a communication link between the client computer and the internet service provider computer via the client computer modem;

having the internet service provider determine the telephone number dialed by a client computer to communicate with the internet service provider;

having the internet service provider determine whether a client computer should dial a different telephone number when a client computer next attempts to establish communication with the internet service provider each time a client computer communicates with the internet service provider;

transmitting the new telephone number from the internet service provider to a client computer when it is determined that a different number should be dialed when the client computer next attempts to establish communication with the internet service provider;

storing the new telephone number in a client computer.

4. The method of claim 3, in which the step of determining whether the client computer should dial a new telephone number includes the following substeps:

identifying the telephone number from which the client computer has dialed a call to the internet service provider telephone number; and selecting one or more additional or replacement telephone numbers which may be dialed by the client computer to establish subsequent communication with the internet service provider based in whole or in part upon the telephone number from which the client computer has called the internet service provider.

5. The method of claim 4, in which the step of selecting one or more additional or replacement internet service provider telephone numbers includes the substep of identifying telephone numbers which are geographically closest to the location from which the user has initiated its call to the internet service provider.

6. The method of claim 4, in which the step of selecting one or more internet service provider telephone numbers further includes the substep of ranking the telephone numbers by the price charged for network access by each internet service provider.

7. The method of claim 4, in which the step of selecting one or more internet service provider telephone numbers further includes the substep of ranking the additional or replacement telephone numbers by the amount of available service capacity.

8. The method of claim 3, in which the step of having the client computer dial a telephone number stored within the client computer toward establishing a communication link between the client computer and the internet service provider computer via the client computer modem further includes the substep of using modem settings stored within the client computer to configure the client computer modem.

9. The method of claim 8 in which the invention further includes the substeps of having the internet service provider identify the modem settings used by the client computer to establish communication with the internet service provider and determining whether modified modem settings should be used by the client computer when the client computer next attempts to establish communication with the internet service provider;

selecting new modem settings to be used by the client computer to establish subsequent communication with the internet service provider;

transmitting new modem settings from the internet service provider to the client computer; and storing the new modem settings in the client.

10. A method for automatically updating network communication configuration settings on a modem equipped client computer which is capable of communicating with an internet service provider, said method comprising the steps of:

having the client computer dial a telephone number stored within the client computer toward establishing a communication link between the client computer and the internet service provider computer via the client computer modem;

having the internet service provider identify a new telephone number the client computer should dial when the client computer next attempts to establish communication with the internet service provider each time the client computer communicates with the internet service provider;

transmitting the new telephone number from the internet service provider to the client computer to be used when the client computer next attempts to establish communication with the internet service provider;

storing the new telephone number in the client computer.

\* \* \* \* \*